US008698942B2

(12) United States Patent  (10) Patent No.: US 8,698,942 B2
Isobe  (45) Date of Patent: Apr. 15, 2014

(54) FOCUS DETECTION APPARATUS

(75) Inventor: Shingo Isobe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 173 days.

(21) Appl. No.: 13/205,816

(22) Filed: Aug. 9, 2011

(65) Prior Publication Data

US 2012/0044397 A1  Feb. 23, 2012

(30) Foreign Application Priority Data

Aug. 18, 2010 (JP) ................................ 2010-183018
Jul. 21, 2011 (JP) ................................ 2011-160057

(51) Int. Cl.
*H04N 5/232* (2006.01)
*H04N 3/14* (2006.01)
*H04N 5/335* (2011.01)
*G03B 13/00* (2006.01)
*G03B 13/02* (2006.01)

(52) U.S. Cl.
USPC ........................... 348/345; 348/298; 396/148

(58) Field of Classification Search
USPC .......... 348/294, 297, 298, 345–357; 396/111, 396/148, 294, 297, 298, 345–357; 345/294, 345/297, 298, 345–357
See application file for complete search history.

(56) References Cited

U.S. PATENT DOCUMENTS

| | | | |
|---|---|---|---|
| 5,594,501 A | 1/1997 | Suzuki | |
| 7,512,330 B2 * | 3/2009 | Ichimiya | ........................ 396/96 |
| 7,577,349 B2 * | 8/2009 | Inoue et al. | ................... 396/111 |
| 8,036,977 B1 * | 10/2011 | Mintz et al. | ...................... 705/37 |
| 8,189,090 B2 * | 5/2012 | Sasaki | ............................ 348/345 |
| 2001/0014215 A1 * | 8/2001 | Ide et al. | ......................... 396/96 |

FOREIGN PATENT DOCUMENTS

| | | |
|---|---|---|
| CN | 101158743 A | 4/2008 |
| JP | 3-238412 A | 10/1991 |
| JP | 3238412 A | 10/1991 |
| JP | 2006-126858 A | 5/2006 |
| JP | 2006126858 A | 5/2006 |
| JP | 2006184320 A | 7/2006 |
| JP | 2007-065324 A | 3/2007 |
| JP | 2008009279 A | 1/2008 |
| JP | 2008-096608 A | 4/2008 |

OTHER PUBLICATIONS

Notification of the First Office Action for corresponding CN 201110232144.6, dated Jul. 16, 2013. English translation provided.

* cited by examiner

*Primary Examiner* — Sinh Tran
*Assistant Examiner* — Tuan Le
(74) *Attorney, Agent, or Firm* — Rossi, Kimms & McDowell (57) ABSTRACT

A focus detection apparatus includes: a photoelectric conversion unit of a charge accumulation type, including a plurality of sensors; an accumulation controller for controlling charge accumulation of the photoelectric conversion unit; an accumulation time measuring unit for measuring accumulation time; a correction computing unit for performing correction computing of a photoelectric conversion signal; and a focus detection computing unit for performing focus detection computing. The accumulation controller detects a signal of accumulation completion in a first sensor of the plurality of sensors, and then forces sensors except the first sensor to terminate the charge accumulation. The correction computing unit performs the correction computing of the photoelectric conversion signal based on first accumulation time that is accumulation time of the first sensor and second accumulation time that is different from the first accumulation time.

18 Claims, 9 Drawing Sheets

|     | SENSOR AREA |          |           |
|-----|-------------|----------|-----------|
|     | 501         | 502      | 503       |
| (a) | 3.0 [ms]    | 2.0 [ms] | 100.0 [ms]|
| (b) | 2.1 [ms]    | 2.0 [ms] | 2.1 [ms]  |
| (c) | 2.1 [ms]    | 2.0 [ms] | 2.1 [ms]  |

|  | SENSOR AREA | | |
| --- | --- | --- | --- |
|  | 501 | 502 | 503 |
| ACCUMULATION TIME | 2.1 [ms] | 2.0 [ms] | 0.4 [ms] |

FOCUS DETECTION APPARATUS

BACKGROUND OF THE INVENTION

1. Field of the Invention

The present invention relates to a focus detection apparatus, and more particularly, to a focus detection apparatus for an object.

2. Description of the Related Art

Conventionally, various proposals have been made for focus detection technologies in image pickup apparatus such as cameras and video cameras. For example, there is proposed a phase difference method using so-called TTL Through the Lens), in which a separation unit is provided in an optical path in an imaging optical system and a focus state is detected using separated beams.

In addition, there is also proposed an external measurement method using so-called non-TTL, in which a focus state is detected using a beam of outside light that is different from the beam in the imaging optical system. Further, there is proposed a method in which a focus state is detected using an image signal output from an image pickup element.

In the focus detection apparatus of the phase difference method and the external measurement method among the above-mentioned methods, photoelectric conversion of a beam from the object is performed by a photoelectric transducer in the focus detection apparatus, and the obtained electric charges are accumulated and read out as image signals. Further, the image signals read out from the photoelectric transducer are used for performing correlation computing to determine a deviation amount of the images, namely a phase difference. In this case, a coincidence degree between two images is used as a correlation score for determining a target value until an in-focus point. In general, a phase difference for which the correlation score becomes extremal and largest is set as the target value with high reliability. Then, the target value is converted into a target position of a focus lens from a defocus amount from the in-focus point or distance information to the object, to thereby perform drive control of the focus lens.

By the way, there are proposed various methods for controlling the charge accumulation operation in focus detection sensors of the phase difference method and the external measurement method. For instance, there is known a control method by automatic gain control (AGC), in which the accumulation operation is terminated when a predetermined signal level is reached. As another example, there is known a control method in which the accumulation operation is terminated at a time point when a predetermined maximum accumulation time has elapsed even if the predetermined signal level has not been reached. In addition, both the above-mentioned two types of accumulation control methods are sometimes used so as to cover a wide dynamic range of object luminance under various image taking conditions.

As a sensor for focus detection in the phase difference method or the external measurement method, a linear sensor formed in a single line or an area sensor formed of a plurality of line sensors is used. In some area sensors, each area thereof is connected to an AGC circuit and accumulation control is performed so that each area can output a signal with an optimal contrast independently. In this way, by disposing a plurality of areas in an image taking screen for performing focus detection, it is possible to perform focus detection computing with an optimal contrast for the focus detection area.

However, if the sensor is divided into a plurality of areas an image may be formed over a plurality of areas. For instance, in the phase difference method, when a large defocus is generated, two formed images may not be contained in one area. In addition, in the external measurement method, depending on a distance of the object, two formed images of an object may be apart too much to be contained in one area so that the images are formed over areas.

By setting an appropriate AGC for each area and performing the correlation computing after linking pieces of data between areas, it is possible to perform focus detection with the use of a plurality of areas. However, a plurality of accumulation operations is necessary, and hence process time of the focus detection is increased. Particularly in a low illuminance environment, because the accumulation time is long, it is difficult to deal a real time process in taking a moving image or the like. Therefore, as a conventional example, there is proposed a method for performing the focus detection computing using two images over a plurality of areas.

For instance, Japanese Patent Application Laid-Open No. 2006-184320 proposes the following method. If focus detection cannot be performed when correlation computing is performed in an m-th area, data of an (m−1)th area or an (m+1)th area as a neighboring area is converted into an arbitrary accumulation time and is linked to data of the m-th area. Then, a correlation computing range is enlarged until the focus detection can be performed. With this configuration, it is possible to cover the case where an image is formed in different areas when a large defocus is generated.

In addition, Japanese Patent Application Laid-Open No. 2008-009279 proposes a method of switching between a first mode in which the accumulation control is performed independently for each area for independently reading out a signal output and a second mode in which the accumulation control is performed integrally for all areas for reading out a signal output. In the configuration of Japanese Patent Application Laid-Open No. 2008-009279, in the second mode, a plurality of areas are linked for performing the accumulation control similarly to a single linear sensor, and individual operating circuits are sequentially driven to output the signals. Therefore, without disposing a dedicated sensor for large defocus, it is possible to perform focus detection over a plurality of areas.

However, in the conventional methods disclosed in Japanese Patent Application Laid-Open Nos. 2006-184320 and 2008-009279, a time lag in the accumulation control of different areas or a difference of accumulation sensitivity between areas is not taken into consideration. Therefore, in the strict sense, the obtained data is different between areas. Therefore, according to the conventional methods of linking pieces of data between areas, different results are obtained between a case where the correlation computing of the same object is performed in a single area and a case where the correlation computing is performed over a boundary between areas, and hence an exact correlation computing result cannot be obtained in some cases.

In particular, in a high illuminance environment, a level difference between areas is conspicuously affected. There is a case where the correlation computing result is different from an inherent value depending on an illuminance condition. As a result, when an automatic focus operation is performed, the focusing operation may cause a blurred state.

In the phase difference method, two images are generally formed in one area as the focus state is closer to the in-focus state. Therefore, accuracy of the correlation computing between areas is improved more as the focus state is closer to the in-focus state. Therefore, it is possible to perform focus control always by feedback control. However, in the case of the external measurement method, which indicates data of distance to an object, a constant result is obtained regardless of the in-focus state or the non-focused state. In other words, the external measurement method is an open-loop focus control method. Therefore, in the case of the external measurement method, an influence of an error of the correlation computing result particularly at a boundary between areas is apt to increase. In addition, also in the case of the phase difference method, if a peak of a luminance level of the object exists at the boundary between areas at a time point when the in-focus state is realized finally, unlike inherent accumulation data, accuracy of the phase difference to be calculated by the correlation computing is decreased.

SUMMARY OF THE INVENTION

Therefore, an object of the present invention is to provide a focus detection apparatus capable of performing focus detection of an object over a plurality of areas with high accuracy in a short time period, and also provide an image pickup apparatus including the focus detection apparatus.

In order to achieve the above-mentioned object, a focus detection apparatus according to the present invention includes: a photoelectric conversion unit of a charge accumulation type, including a plurality of sensors each having a plurality of image pixels; an accumulation controller for controlling charge accumulation of the photoelectric conversion unit; an accumulation time measuring unit for measuring accumulation time from charge accumulation start to charge accumulation end of each of the plurality of sensors of the photoelectric conversion unit; a correction computing unit for performing correction computing of a photoelectric conversion signal of the each of the plurality of sensors of the photoelectric conversion unit; and a focus detection computing unit for performing focus detection computing by using the photoelectric conversion signal corrected by the correction computing unit, in which: the accumulation controller detects a signal of accumulation completion in a first sensor of the plurality of sensors, and then forces sensors except the first sensor to terminate the charge accumulation; and the correction computing unit performs the correction computing of the photoelectric conversion signal based on first accumulation time that is accumulation time of the first sensor and second accumulation time that is different from the first accumulation time.

The present invention can provide the focus detection apparatus capable of performing focus detection of the object over a plurality of areas with high accuracy in a short time period, by appropriately correcting accumulation data of a target area before linking the data for performing correlation computing.

Further features of the present invention will become apparent from the following description of exemplary embodiments with reference to the attached drawings.

DESCRIPTION OF THE EMBODIMENTS

Figure 1:
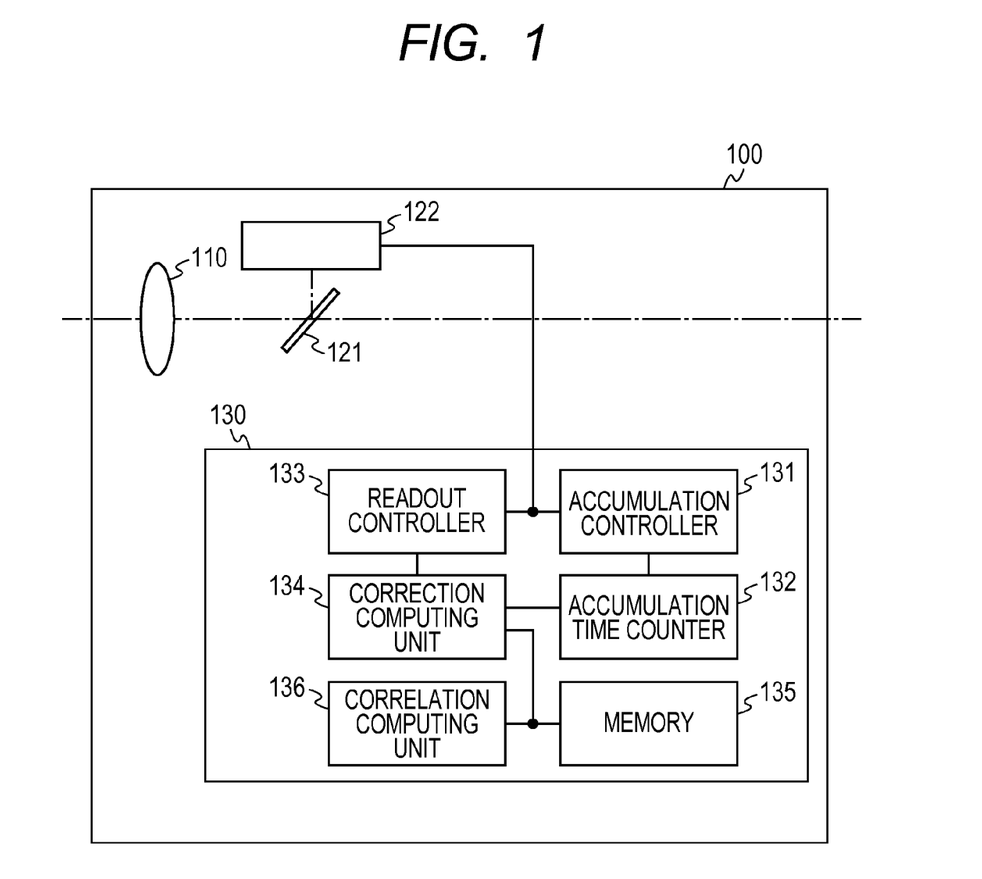
FIG. 1 is a configuration diagram according to a first embodiment of the present invention.

Hereinafter, exemplary embodiments of the present invention are described in detail with reference to the attached drawings. FIG. 1 is a configuration diagram according to an embodiment of the present invention.

First Embodiment

Hereinafter, with reference to FIG. 1, a focus detection apparatus 100 according to a first embodiment of the present invention is described.

The focus detection apparatus 100 includes an imaging optical system 110, which includes a focus lens unit.

On the image plane side of the imaging optical system 110, a half mirror 121 is provided. The half mirror as used herein is any optical member (beam splitting member) that splits a beam from an object into two beams. For instance, the half mirror may be a polarizing beam splitter or may be an optical member that splits a beam into two (a plurality of) with (almost) no relation to polarization. However, it is desired that the half mirror (beam splitting member) have less dependence on wavelength.

A beam from the object entering the focus detection apparatus 100 passes through the imaging optical system 110 and is split into a beam passing through the half mirror 121 and a beam reflected by the half mirror 121. The beam reflected by the half mirror 121 enters a sensor 122.

The sensor 122 that is a photoelectric conversion unit includes two pairs of secondary imaging lenses (not shown) and two pairs of AF sensors as phase difference sensors (not shown). The sensor includes a plurality of area sensors, each of which is a line sensor constituted of a plurality of image pixels (photoelectric transducers). A pair of object images (hereinafter, referred to as two images) is formed on each area sensor by two beams split by each pair of secondary imaging lenses after being reflected by the half mirror 121. The photoelectric transducer is a charge accumulation type sensor, and each area sensor performs photoelectric conversion of the two images and accumulates charges thereof to generate two image signals. A phase difference corresponding to a focus state of the focus detection apparatus 100 can be obtained from the two image signals. As described above, the area sensor described in this embodiment is sufficient to be a sensor having a plurality of image pixels (photoelectric transducer having a plurality of image pixels). In other words, the area sensor described in this embodiment may be a line sensor in which a plurality of image pixels are arranged in one line or a two-dimensional sensor in which a plurality of image pixels are arranged in a two-dimensional manner.

When the focus detection apparatus 100 is in in-focus state, the phase difference corresponding to an interval between two images indicates a specific value. In the case of so-called front focus state, the phase difference is smaller than the specific value. In addition, in the case of so-called rear focus state, the phase difference is larger than the specific value. In this way, the sensor 122 generates two image signals for obtaining the phase difference between object images formed by light entering the focus detection apparatus 100.

The focus detection apparatus 100 includes a CPU 130. The CPU 130 is constituted by an accumulation controller 131, an accumulation time counter 132, a readout controller 133, a correction computing unit 134, a memory 135, and a correlation computing unit 136.

The accumulation controller 131 as an accumulation control unit is connected to the sensor 122 to perform charge accumulation start control of each area sensor of the sensor 122, detection of accumulation completion by an auto gain control (AGC) circuit (not shown) and storage of the area sensor, and charge accumulation end control. When the accumulation controller 131 starts accumulation operation of the sensor 122, the accumulation time counter 132 as an accumulation time measuring unit starts to count accumulation time of each area sensor. Then, the count is stopped when the accumulation controller 131 detects an accumulation completion signal of the sensor 122 or terminates the accumulation operation. When the accumulation operations of all the area sensors of the sensor 122 are terminated, the readout controller 133 reads out accumulation data. The readout accumulation data is converted into corrected data by the correction computing unit 134 and is stored in the memory 135. Details of the conversion into the corrected data are described later. Then, the correlation computing unit 136 as a focus detection computing unit uses the corrected data stored in the memory 135 and performs correlation computing to calculate the phase difference, to thereby detect a focus state of the focus detection apparatus 100.

Figure 2:
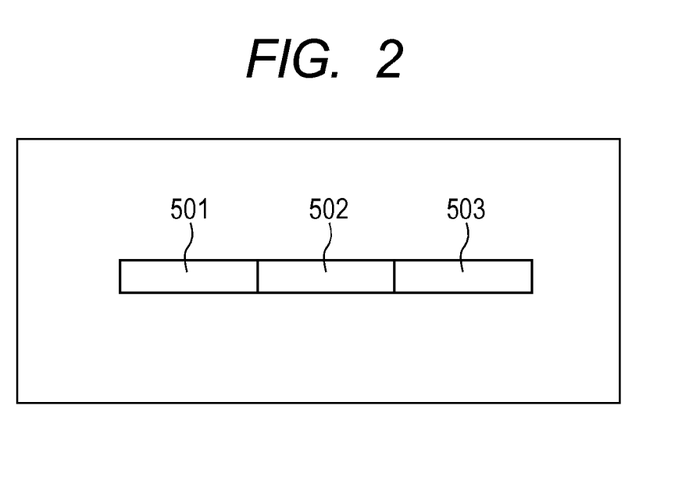
FIG. 2 is a first diagram illustrating a configuration of a sensor in the first embodiment.
Figure 3:
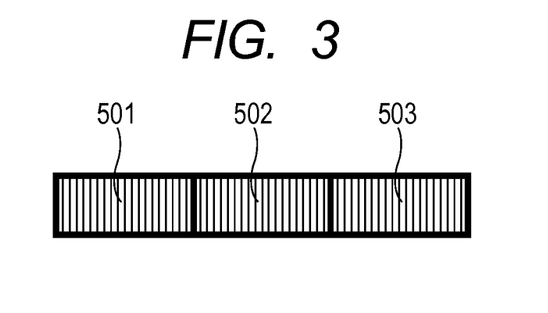
FIG. 3 is a second diagram illustrating the configuration of the sensor in the first embodiment.
Figure 4:
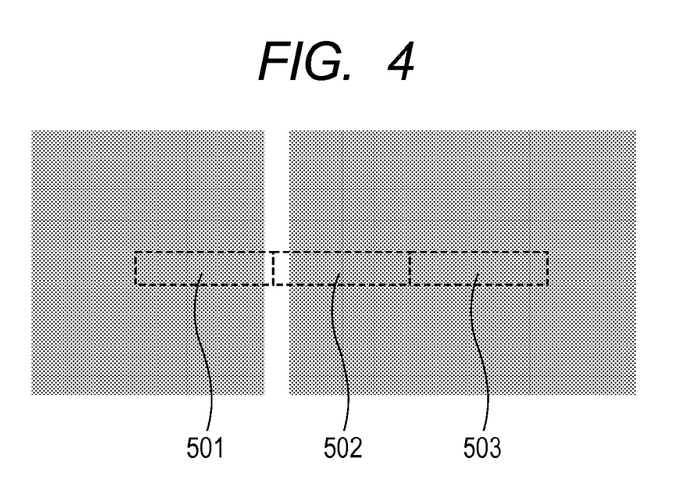
FIG. 4 is a diagram illustrating an example of a positional relationship between an image taking screen and sensors in the first embodiment.

Here, FIG. 2 illustrates an example in which focus detection area sensors of the sensor 122 are superimposed on an image taking screen. FIG. 2 illustrates focus detection area sensors 501 to 503. The area sensors 501, 502, and 503 are disposed in order from the left side of FIG. 2, and each area sensor is connected to the auto gain control (AGC) circuit (not shown). In addition, each area sensor is constituted by a line sensor formed of a plurality of image pixels as illustrated in FIG. 3. FIG. 4 illustrates a manner of a taken image when an image of an object is taken. This object is a bar of bright color in the background of dark color. As illustrated in FIG. 4, the bright color bar as an object is positioned over the area sensors 501 and 502. The first embodiment describes the case where a focus state of the object is accurately detected in an image taking composition illustrated in FIG. 4.

Figure 5:
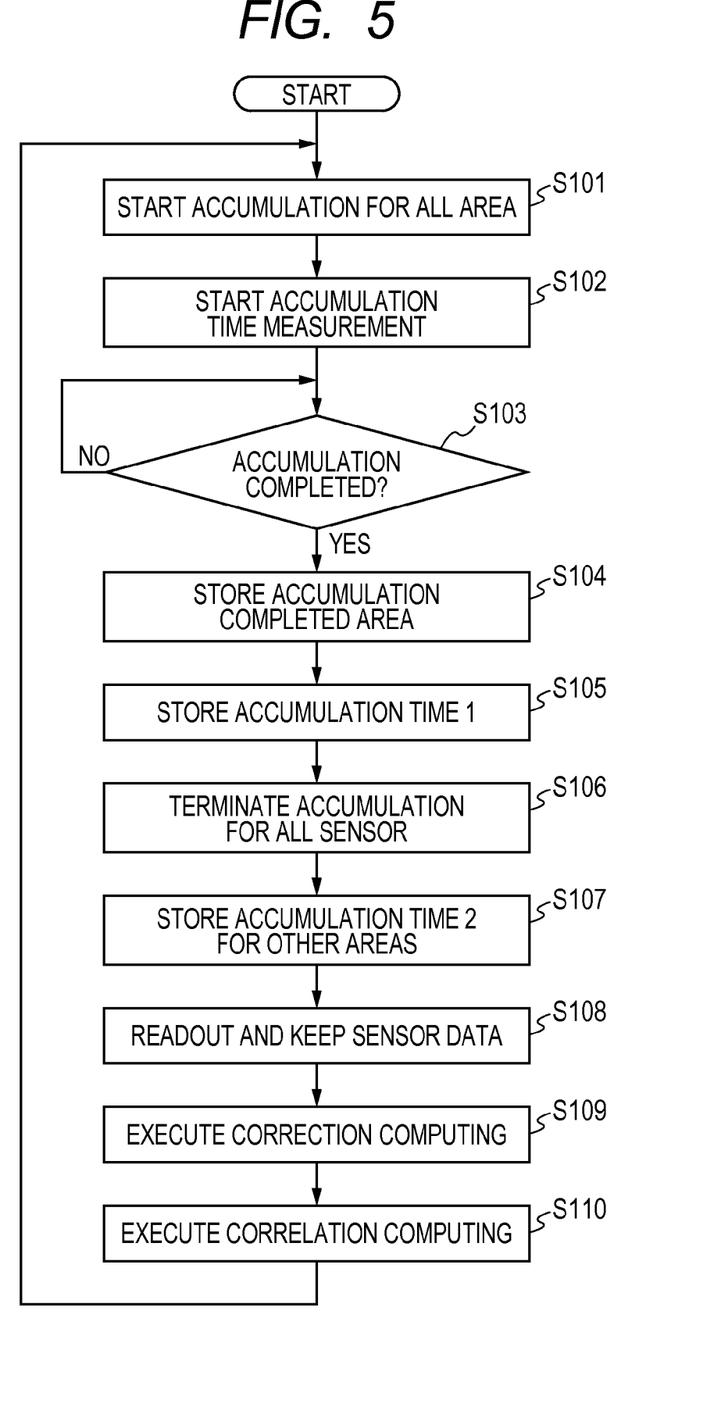
FIG. 5 is a flowchart of a process in the first embodiment.

FIG. 5 is a flowchart illustrating a focus detection process flow in the focus detection apparatus 100. The CPU 130 controls the process according to a computer program (not shown) stored in the memory.

When power is supplied to the focus detection apparatus 100, the CPU 130 executes the process from Step S101. In Step S101, the accumulation controller 131 initializes the area sensors 501 to 503 of the sensor 122 to start the accumulation.

Next, in Step S102, the accumulation time counter 132 starts measurement of the accumulation time of the area sensors 501 to 503.

Next, in Step S103, the accumulation controller 131 waits for accumulation completion of any one of the area sensors of the sensor 122. The AGC circuit (not shown) of the sensor 122 monitors charge accumulation levels of the respective area sensors 501 to 503. If there is at least one area sensor (first area sensor) in which the charge accumulation amount exceeds an AGC threshold value for accumulation completion, the AGC circuit outputs an accumulation completion signal to the accumulation controller 131. When the accumulation controller 131 detects the accumulation completion signal, the CPU 130 proceeds to Step S104 via Step S103.

In Step S104, the accumulation controller 131 stores the area sensor that has completed the accumulation in Step S103 and proceeds to Step S105. In Step S105, the accumulation time counter 132 stores accumulation time 1 of the area sensor that has completed the accumulation in Step S103. Next, the process flow proceeds to Step S106.

In Step S106, the accumulation controller 131 terminates accumulation of each area sensor except the area sensor that has completed the accumulation and has been stored in Step S104.

Next, in Step S107, the accumulation time counter 132 stores accumulation time 2 of the area sensors except the area sensor for which the accumulation time 1 has been stored in Step S105.

Next, in Step S108, the readout controller 133 reads out the accumulation data of each area sensor from the sensor 122. Then, in Step S109, the correction computing unit 134 performs correction computing of the accumulation data of the area sensors except the area sensor that has completed the accumulation and has been stored in Step S104, by using the accumulation time 1 and the accumulation time 2. Then, the corrected accumulation data is stored in the memory 135.

Next, in Step S110, the correlation computing unit 136 uses the accumulation data stored in the memory 135 to link pieces of the accumulation data of the area sensors 501 and 502 and perform the correlation computing, to thereby calculate the phase difference. Then, the process flow returns to Step S101 again. The CPU 130 repeatedly executes the above-mentioned process.

Here, a specific example is used for describing contents of the flowchart illustrated in FIG. 5.

Figure 6:
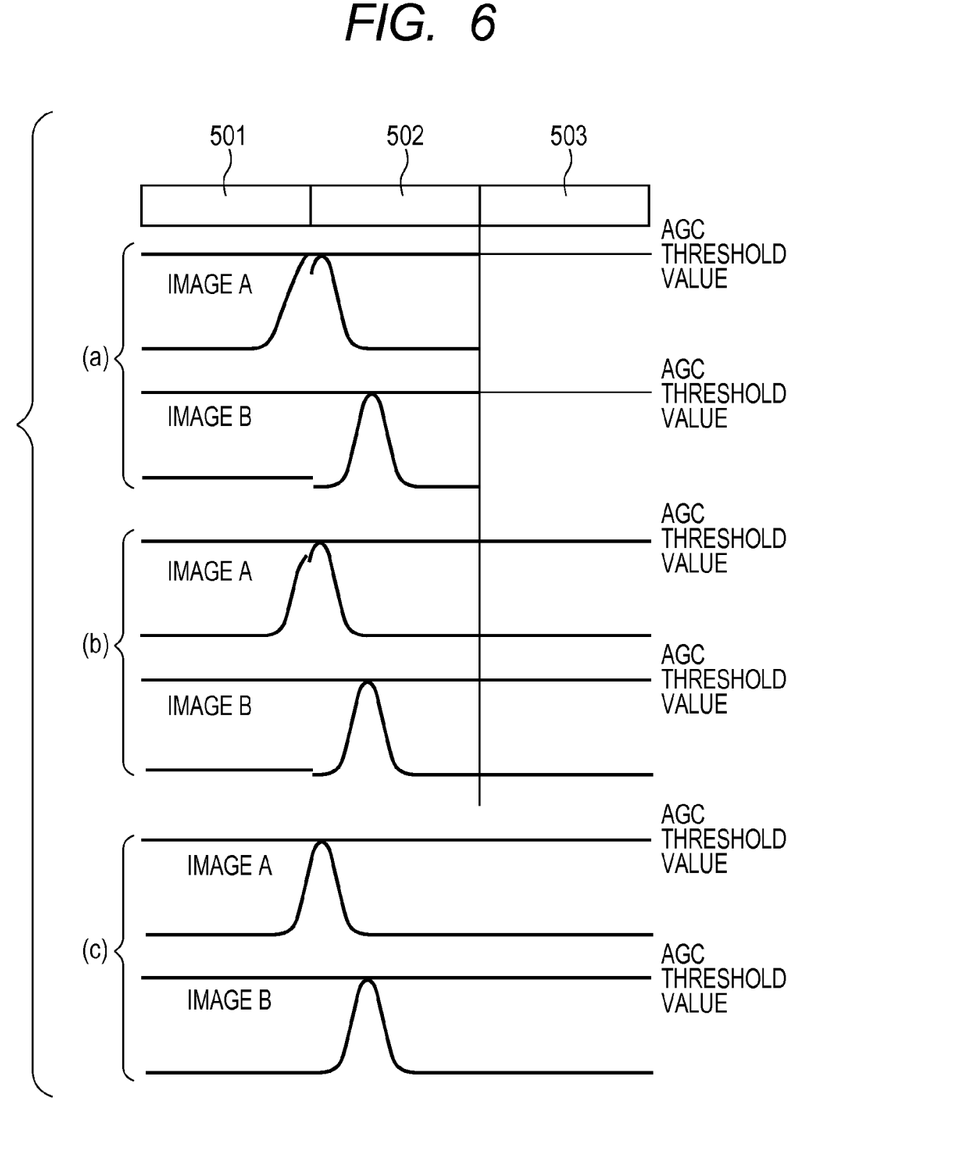
FIG. 6 is a diagram illustrating an example of sensor outputs in the first embodiment.

FIG. 6 illustrates three output waveforms (a) to (c) of Image A and Image B of two image signals read out from the sensor 122 in the image taking screen illustrated in FIG. 4. With reference to FIG. 6, specific description is given along with the flowchart illustrated in FIG. 5.

Steps S101, S102, and S103 are as described above.

Figure 7:
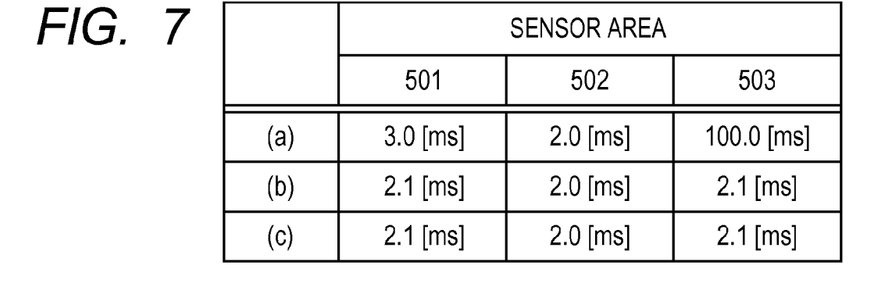
FIG. 7 is a table showing an example of accumulation time of the sensors in the first embodiment.

In Step S103, for example, if a signal is read out after waiting for completion of accumulation in each area sensor, the charge accumulation continues until the charge accumulation amount of at least one line sensor in each area sensor reaches a predetermined AGC level. Therefore, the waveforms (a) of FIG. 6 are obtained. In addition, part (a) of FIG. 7 illustrates an example of accumulation time of the area sensors. The accumulation is completed first in the area sensor 502 having a peak of luminance level both in Image A and Image B, at 2.0 millisecond (hereinafter referred to as ms). Next, the accumulation in the area sensor 501 is completed at 3.0 ms. Finally, the accumulation in the area sensor 503 is completed at 100.0 ms. In this case, a waveform in a vicinity of the peak of luminance level in Image A is over the area sensors 501 and 502 of the sensor 122. The area sensor 501 of the sensor 122 performs the accumulation longer than the area sensor 502 by 1.0 ms, which is a difference of the accumulation time. Therefore, when the waveforms are linked, a discontinuity occurs at a boundary between the area sensors. For this reason, when the correlation computing is performed, a peak shape in Image A is different from a peak shape in Image B. As a result, it is difficult to obtain an accurate correlation computing result.

Therefore, when the accumulation of at least one area sensor is completed, accumulation of all the other area sensors is terminated. The waveform obtained in this case is as illustrated in part (b) of FIG. 6. The process until the waveform (b) of FIG. 6 is obtained is described. In addition, an example of the case where the accumulation time of each area sensor is as illustrated in part (b) of FIG. 7 is described.

In Step S103 of FIG. 5, the accumulation is completed first in the area sensor 502. When the accumulation controller 131 detects completion of the accumulation of the area sensor 502, the process flow proceeds to Step S104 via Step S103. In Step S104, the accumulation controller 131 stores the area sensor 502 as an area sensor that has completed the accumulation. Next, the process flow proceeds to Step S105, in which the accumulation time counter 132 stores the accumulation time of the area sensor 502 as first accumulation time. In this case, according to part (b) of FIG. 7, 2.0 ms is stored as the first accumulation time. Next, the process flow proceeds to Step S106, in which the accumulation controller 131 forces the area sensors 501 and 503 that are performing the accumulation to terminate the accumulation. Then, the process flow proceeds to Step S107, in which the accumulation time counter 132 stores the accumulation time of the area sensors 501 and 503 as second accumulation time. In this case, according to part (b) of FIG. 7, 2.1 ms is stored as the second accumulation time.

Figure 8:
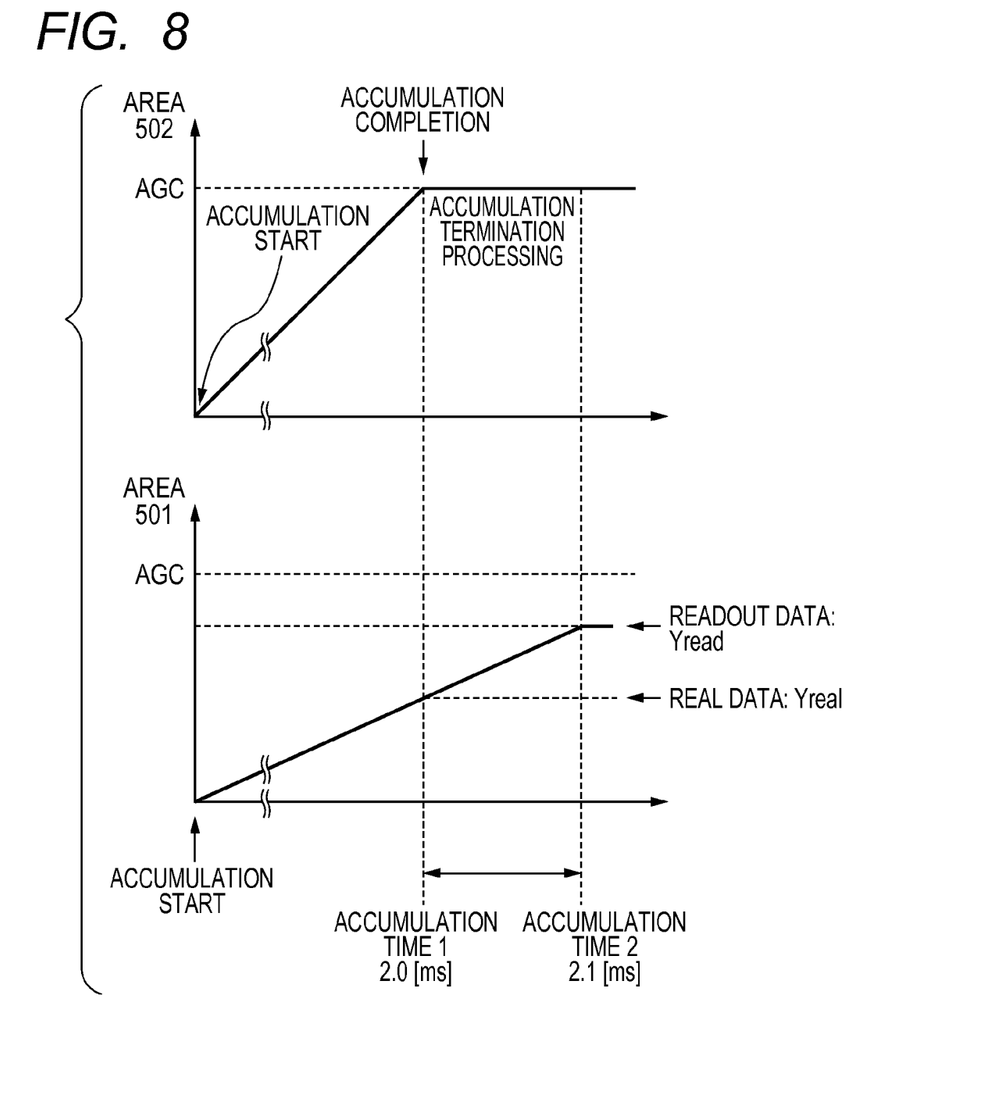
FIG. 8 is a diagram illustrating an accumulation process of the sensor in the first embodiment.

In Step S108, accumulation data of the sensor is read out. As a waveform in this case, the waveform illustrated in part (b) of FIG. 6 as described above is obtained. Here, FIG. 8 illustrates transition of data accumulated in the area sensors 501 and 502. The horizontal axis of FIG. 8 represents the accumulation time measured by the accumulation time counter 132. The vertical axis of FIG. 8 represents the data accumulated in each area sensor of the sensor 122. According to FIG. 8, a time lag from detection of accumulation end of the area sensor 502 (first area sensor) in Step S103 to completion of accumulation termination processing of the area sensors 501 and 503 in Step S106 is 0.1 ms, which is a difference time with the area sensor 502 illustrated in part (b) of FIG. 7. Due to this time lag, the photoelectric conversion signal is excessively accumulated in each of the area sensors 501 and 503. As illustrated in part (b) of FIG. 6, Image A has a slight discontinuity at a boundary between the area sensors 501 and 502. Essentially, it is desired to terminate accumulation of the area sensor 501 at the same time as the accumulation completion of the area sensor 502. Therefore, real data Yreal of the area sensor 501 exists as illustrated in FIG. 8.

In Step S109, the correction computing is performed with respect to the accumulation data of the area sensors 501 and 503 that are data except for the area sensor 502. As illustrated in FIG. 8, as to the real data Yreal, it is sufficient to correct an excess accumulation amount of the above-mentioned time lag, that is 0.1 ms in this embodiment. The accumulation amount can be regarded to be proportional to the accumulation time. Therefore, by multiplying a ratio between first accumulation time T1 and second accumulation time T2 that is different from the first accumulation time by a readout accumulation amount Yread of each image pixel in the area sensors except the first area sensor, the accumulation amount Yreal at the first accumulation time T1 can be calculated as expressed in the following equation (1).

$$Yreal = Yread \times T1/T2 \quad (1)$$

The data to be accumulated excessively by the above-mentioned time lag has a different extent of influence depending on a light amount entering the sensor. For instance, when a peak level of the accumulation data is 100 with reference to accumulation time 2.0 ms of the area sensor 502, maximum accumulation data accumulated for a time lag of 0.1 ms is 5, which generates an error amount of 5% at maximum.

The light amount entering the sensor per unit time is different depending on luminance. Therefore, even for the same time lag of 0.1 ms, an error amount between area sensors becomes larger as the luminance is higher.

Therefore, if the object of high luminance is in a vicinity of a boundary between area sensors under an image taking environment of high luminance, data to be accumulated in the time lag increases. Therefore, there is high probability that a discontinuity occurs when the area sensors are linked.

The flowchart illustrated in FIG. 5 is further described. In Step S109, when the equation (1) is applied to the area sensors 501 and 503 by the correction computing unit 134, the corrected accumulation data illustrated in part (c) of FIG. 6 is obtained. The data illustrated in part (c) of FIG. 6 can provide continuity of accumulation data at a boundary between area sensors when the accumulation data of the area sensors are connected. Then, the process flow proceeds to Step S110, in which pieces of the accumulation data of the area sensors 501 to 503 are connected to perform the correlation computing.

In this way, originally desired accumulation data can be obtained by cutting off data accumulated for the time lag after detection of accumulation end of a certain area sensor until accumulation end of the other area sensor. As a result, accuracy of the correlation computing result can be improved.

Second Embodiment

The first embodiment has exemplified the case where all the area sensors 501 to 503 are used to perform the correlation computing. A second embodiment exemplifies a configuration that can stably perform the correlation computing also in an image taking environment illustrated in FIG. 9.

Figure 9:
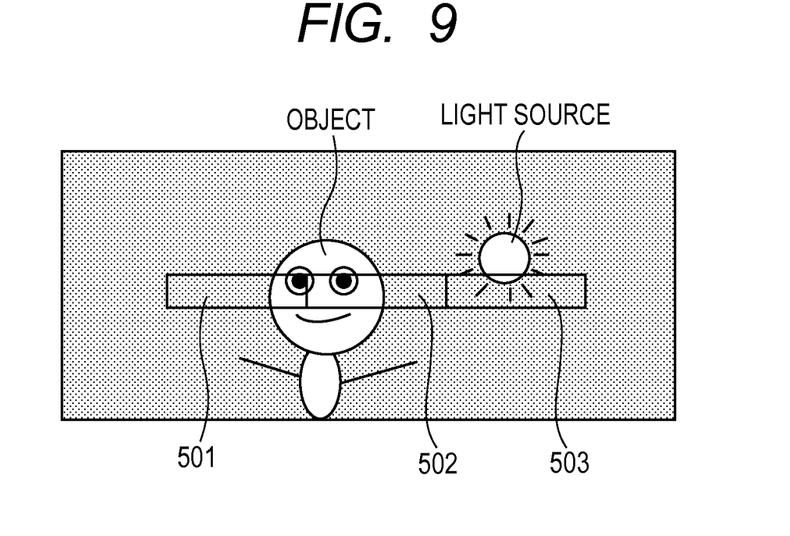
FIG. 9 is a diagram illustrating an example of a positional relationship between the image taking screen and the sensors in a second embodiment of the present invention.
Figure 10:
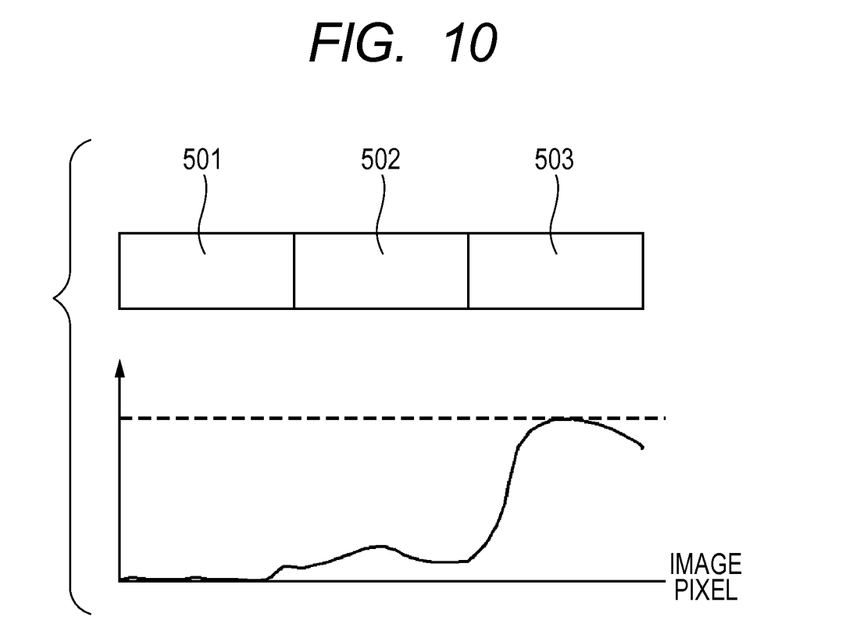
FIG. 10 is a diagram illustrating an example of sensor outputs in the second embodiment.

The image taking example illustrated in FIG. 9 is an image taking environment in which there exist an object and a high luminance light source in the back thereof. In this case, the light source has higher luminance than the object, and hence the accumulation is completed first in the area sensor 503 among the area sensors 501 to 503. When the first embodiment is applied, accumulation data of the sensor illustrated in FIG. 10 is read out by the readout controller 133 in Step S105 of FIG. 5. Note that, for convenience sake, FIG. 10 illustrates only Image A without illustrating Image A and Image B as in FIG. 6. In the case of the waveform as illustrated in FIG. 10, a contrast of the accumulation data of the area sensors 501 and 502 corresponding to the object to be a target cannot be obtained. Therefore, accuracy of the correlation computing result may be decreased. Therefore, it is desired to read out data after accumulation is performed until an appropriate contrast is obtained in the area sensor in which the target object exists.

Therefore, in this embodiment, an application example of the focus detection apparatus that can perform stable focus detection also in such an image taking condition is described. Specifically, a selection switch for selecting an object is disposed, so that a target area sensor is selected, and by waiting for accumulation completion of the target area sensor, it is possible to extract the accumulation data corresponding to the object with an appropriate contrast.

Figure 11:
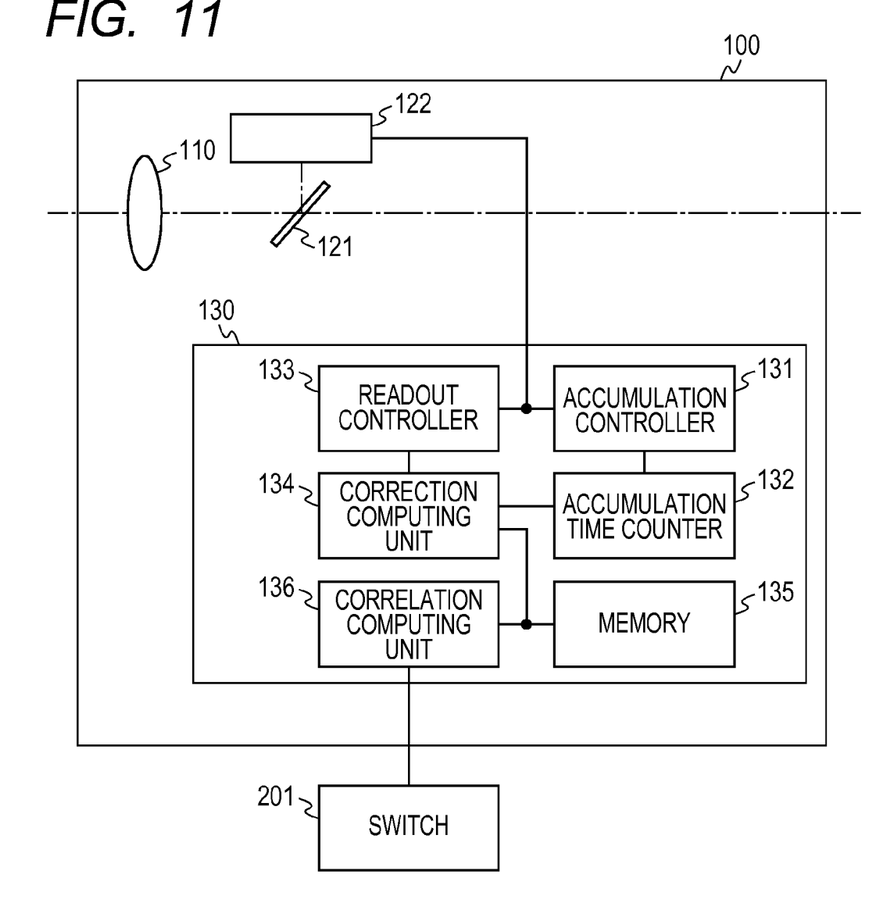
FIG. 11 is a configuration diagram in the second embodiment.
Figure 12:
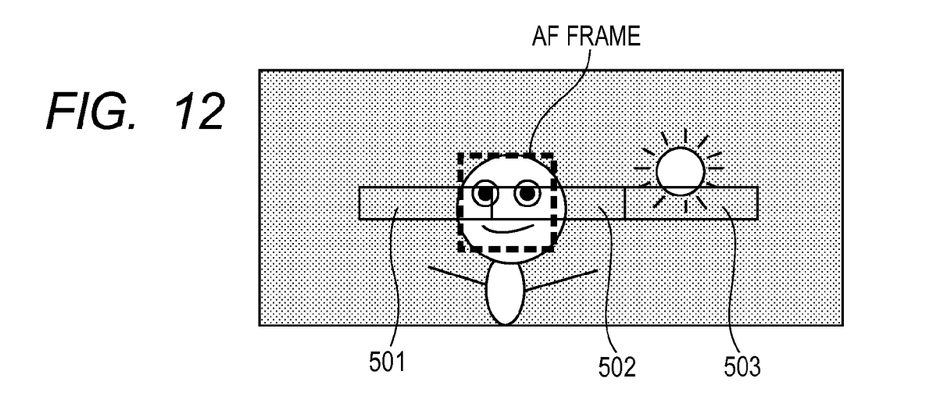
FIG. 12 is a diagram illustrating an example of a positional relationship among the image taking screen, an AF frame, and the sensors in the second embodiment.

FIG. 11 illustrates a configuration diagram of this embodiment. The configuration of the second embodiment includes, in addition to the same configuration as in the first embodiment illustrated in FIG. 1, a switch 201 as a range selector for selecting an arbitrary object. FIG. 12 illustrates an image taking diagram indicating an AF frame for selecting the object for focusing by the switch 201. As illustrated in FIG. 12, the object exists over the area sensors 501 and 502 similarly to the first embodiment. In this embodiment, an example in which a focus state of a target object is detected with high accuracy in the image taking composition illustrated in FIG. 12 is described.

Figure 13:
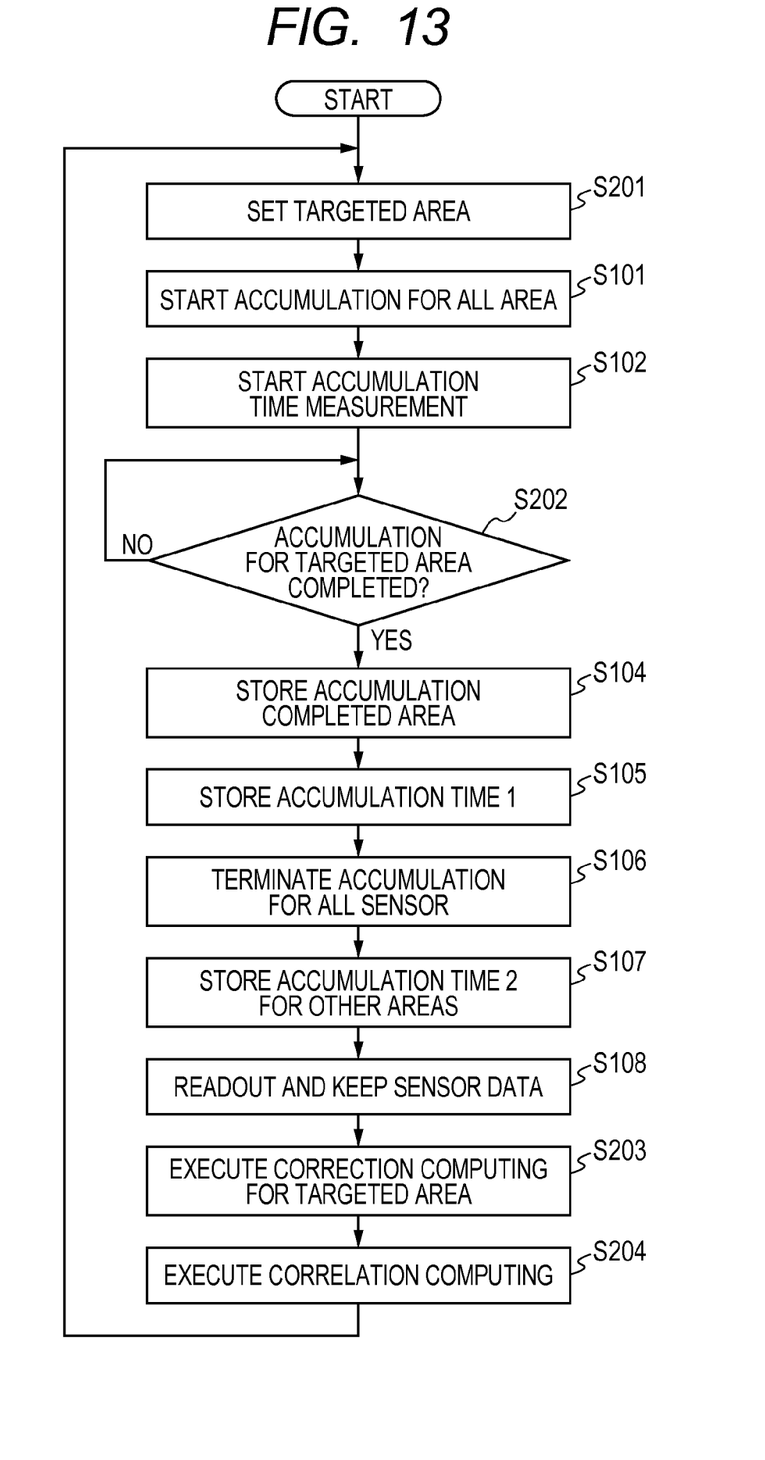
FIG. 13 is a flowchart of a process in the second embodiment.

FIG. 13 is a flowchart illustrating a focus detection process performed by the focus detection apparatus 100. The CPU 130 controls the process according to a computer program (not shown) stored in the memory.

When power is supplied to the focus detection apparatus 100, the CPU 130 proceeds to Step S201, to distinguish the sensor corresponding to an area of the AF frame selected by the switch 201. According to the image taking diagram illustrated in FIG. 12, the area sensors 501 and 502 are selected in this case.

Next, the process flow proceeds to Step S101, in which the accumulation controller 131 starts accumulation of all the area sensors of the sensor 122 similarly to the first embodiment. Then, the process flow proceeds to Step S102, in which the accumulation time counter 132 starts measurement of the accumulation time.

Next, the process flow proceeds to Step S202. In Step S202, the accumulation controller 131 waits for accumulation completion of the target area sensors corresponding to the AF frame selected in Step S201. At first, the accumulation of the area sensor 503 is completed. The accumulation is completed in the area sensor 503 first, because the light source exists in the back of the object and the area sensor 503 has higher luminance than the area sensor 501 or 502 in which the object exists.

Figure 14:
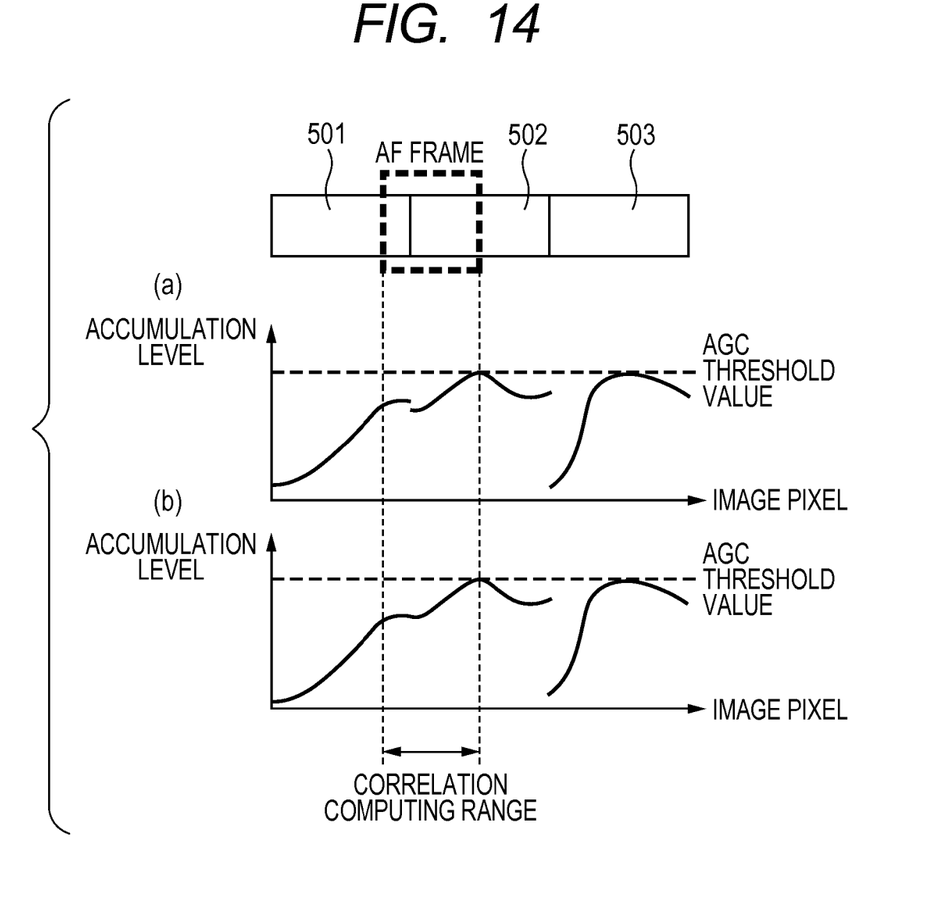
FIG. 14 is a diagram illustrating an example of the sensor outputs in the second embodiment.
Figure 15:
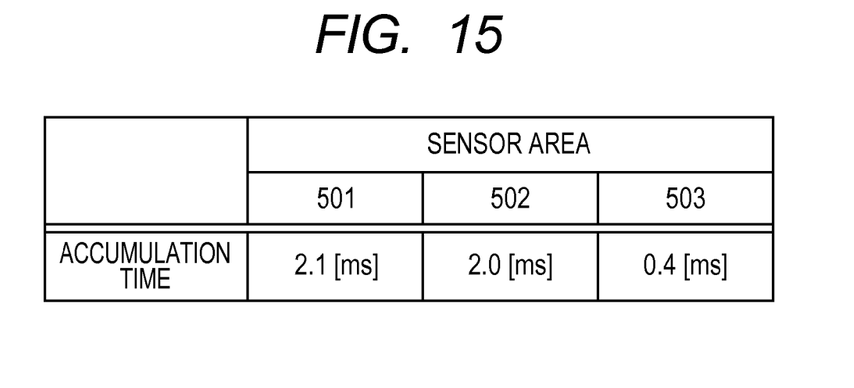
FIG. 15 is a diagram illustrating an example of accumulation time of the sensors in the second embodiment.

Here, in Step S202 of FIG. 13, the process until the accumulation completion of the target area sensors is described with reference to FIGS. 10, 14, and 15. FIG. 14 is a diagram illustrating the accumulation data of each area sensor of the sensor 122 in each process. FIG. 15 illustrates the accumulation time of each area sensor of the sensor 122. FIG. 10 illustrates an accumulation level of each area sensor at a time point when the accumulation of the area sensor 503 is completed. The accumulation time of the area sensor 503 at this time is 0.4 ms as illustrated in FIG. 15. Because the area sensor 503 is not a target area sensor selected in Step S201, Step S202 is repeatedly performed after that. Then, as illustrated in a part of the area sensor 502 in part (a) of FIG. 14, the area sensor 502 as the target area sensor reaches the AGC threshold value to complete the accumulation, and the process flow proceeds to Step S104.

The process from Step S104 to Step S108 is the same as in the first embodiment. In Step S104, the area sensor 502 is stored by the accumulation controller 131 as the target area sensor for which the accumulation has been completed. Next, in Step S105, the accumulation time counter 132 stores accumulation time of 2.0 ms of the area sensor 502 illustrated in FIG. 15 as the accumulation time 1. Then, Step S106 is performed, and the accumulation of the area sensor 501 is terminated by the accumulation controller 131.

Next, the process flow proceeds to Step S107, in which accumulation time of 2.1 ms of the area sensor 501 is stored as the accumulation time 2 by the accumulation time counter 132. The accumulation time of the respective area sensors in this case are illustrated in FIG. 15.

Next, the process flow proceeds to Step S108. Accumulation data of the sensor 122 to be read out by the readout controller 133 is as illustrated in part (a) of FIG. 14. In part (a) of FIG. 14, it is indicated that the area sensors 502 and 503 have reached the AGC threshold value in Step S202 to complete the accumulation. Then, the accumulation of the area sensor 501 is performed in a period of time from Step S202 to Step S106, that is, 0.1 ms, which is a difference value of the accumulation times between the area sensors 501 and 502. Therefore, it is understood that a discontinuity occurs in the accumulation data at a boundary between the area sensors 501 and 502.

Next, the process flow proceeds to Step S203, in which the correction computing of the target area sensors is performed. The correction computing is applied to the area sensor 501, which is an area sensor except the area sensor 502 that has completed the accumulation and has been stored in Step S104, between the area sensors 501 and 502 that are target area sensors set in Step S201. The equation of the correction computing is as expressed in the equation (1) in the first embodiment. As a result of applying this correction computing, part (b) of FIG. 14 is obtained.

Then, the process flow proceeds to Step S204, in which data corresponding to the area selected by the switch 201 is read out from the memory 135, and pieces of the data are linked to perform the correlation computing. The accumulation data and the correlation computing range in this case are as illustrated in part (b) of FIG. 15.

The CPU 130 performs Step S204 and then repeatedly performs the process from Step S201.

In this way, by disposing a unit selecting a target object, it is possible to perform the accumulation so that the target area sensor has an appropriate contrast. Then, by the correction unit for a boundary between area sensors, it is possible to extract appropriate accumulation data in the area corresponding to the target object, to thereby improve the correlation computing accuracy.

The exemplified embodiments of the present invention are described above, but it is needless to say that the present invention is not limited to those embodiments, and various modifications and changes can be made within the scope of the spirit of the present invention.

For instance, it is possible to combine the processes described in the first embodiment and the second embodiment. Further, it is possible to switch the processes by a switch unit in order to support a plurality of image taking scenes.

Note that, the first embodiment and the second embodiment describe the configuration examples in a TTL phase difference method, but the same effect can be obtained by a configuration of the external measurement method in which the sensor 122 is disposed outside the focus detection apparatus 100 without using the half mirror 121, and an external beam is used for detecting the focal point.

In addition, in the embodiments of the present invention, the area sensor formed of three area sensors is used, but it is needless to say that the number of the area sensors is not limited. The present invention can be applied also to a configuration in which a plurality of area sensors is arranged in the vertical direction or in the horizontal direction. However, if pieces of data are linked for performing the correlation computing after the correction computing of the present invention, it is desired that the area sensors to be linked be adjacent to each other. If there is a space between the area sensors to be linked, it is possible to convert the space based on a relationship between data of image formed on the sensor and a focal length, and then link the pieces of data so as to perform the correlation computing.

Further, in the present invention, the individual components except the switch 201 are disposed in the focus detection apparatus 100 as illustrated in FIG. 11, but the components may be distributed in different devices. In addition, the accumulation controller 131, the accumulation time counter 132, the readout controller 133, the correction computing unit 134, the memory 135, and the correlation computing unit 136 are disposed in the single CPU 130, but the units may be distributed in different CPUs and arithmetical units, or may be constituted by hardware, or may be constituted outside the focus detection apparatus 100.

In addition, it is described that a part of the time lag between Step S101 and Step S102, the time lag between Step S103 and Step S105 and the time lag between Step S106 and Step S107 described in FIG. 5 is negligible in the first embodiment. In addition, it is described that a part of the time lag between Step S101 and Step S102, the time lag between Step S202 and Step S105 and the time lag between Step S106 and Step S107 in FIG. 13 is negligible in the second embodiment. However, in a strict sense, there is a part generating a time lag depending on a configuration method, and it may be difficult to measure real accumulation time of each area sensor. Therefore, if the time lag is known in advance, it is possible to provide an offset or a coefficient for the accumulation time 1 or the accumulation time 2 in the equation (1) for the correction computing. In addition, if the accumulation time 1 or the accumulation time 2 cannot be strictly measured, delay time on design or difference time between area sensors of the accumulation time measured by another unit may be previously incorporated as a constant in the equation (1) for the correction computing. In other words, the accumulation time 1 plus a predetermined difference time may be set as the accumulation time 2.

In addition, the switch 201 is used for selecting the target area sensor, and the accumulation of all area sensors is started in Step S101 of FIG. 13 in the second embodiment, but it is also possible to perform the accumulation only in the target area sensor set in Step S201. In addition, the correlation computing is performed only in the area selected by the switch 201 in Step S204 of FIG. 13, but it is also possible to use all the area sensors to which the area selected by the switch 201 belongs, for performing the correlation computing.

In addition, the second embodiment describes an example in which the target area is selected, and accumulation completion of the target area is waited for even if there is a high luminance light source or the like, but it is also possible to obtain the same effect without selecting the target area. Specifically, the following process may be performed. First, a threshold value of the accumulation time is set. Then, if the accumulation is completed in time shorter than the threshold value of the accumulation time, it is determined that light from a high luminance light source (object) enters the sensor (area sensor) that has completed the accumulation in the short time period. Here, it is possible to continue the accumulation in other sensor (area sensor) even if the accumulation of the sensor determined to receive the light from the high luminance light source has been completed. Further, the sensor determined to receive the light from the high luminance light source is not limited to one but may be plural, as a matter of course. In addition, the threshold value of the accumulation time may be set arbitrarily by an operator, or may be automatically derived by the apparatus of the present invention based on an amount of light entering the area sensor (an object image, or an object image on the image pickup element, or a light amount on the image pickup element).

As described above, the focus detection apparatus of the present invention enables to perform the focus detection of an object over a plurality of areas with high accuracy in a short time period. In addition, it is possible to realize the image pickup apparatus having the effect of the present invention by providing the image pickup apparatus with the focus detection apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-183018, filed Aug. 18, 2010, and No. 2011-160057, filed Jul. 21, 2011 which are hereby incorporated by reference herein in their entirety.

What is claimed is:

1. A focus detection apparatus comprising:
   a photoelectric conversion unit of a charge accumulation type, including a plurality of sensors each having a plurality of image pixels;
   an accumulation controller for controlling charge accumulation of the photoelectric conversion unit;
   an accumulation time measuring unit for measuring accumulation time from charge accumulation start to charge accumulation end of a first sensor among the plurality of sensors of the photoelectric conversion unit;
   a correction unit for performing correction of a photoelectric conversion signal of a second sensor among the the plurality of sensors of the photoelectric conversion unit; and
   a focus detection unit for performing focus detection using the photoelectric conversion signal of the second sensor corrected by the correction unit and a photoelectric conversion signal of the first sensor,
   wherein:
      the accumulation controller detects accumulation completion in the first sensor, and then causes the second sensor to terminate the charge accumulation; and
      the correction unit performs the correction of the photoelectric conversion signal of the second sensor based on first accumulation time of the first sensor and second accumulation time of the second sensor.

2. A focus detection apparatus according to claim 1, wherein the correction unit performs the correction by multiplying a ratio between the first accumulation time and the second accumulation time by the photoelectric conversion signal of the second sensor.

3. A focus detection apparatus according to claim 1, wherein the first sensor is a sensor, among the plurality of sensors of the photoelectric conversion unit, in which the charge accumulation has been completed first.

4. A focus detection apparatus according to claim 1, wherein the second accumulation time is accumulation time of the second sensor for which the accumulation is caused to be terminated by the accumulation controller.

5. A focus detection apparatus according to claim 1, wherein the second accumulation time has a value obtained by adding a predetermined value to the first accumulation time.

6. A focus detection apparatus according to claim 1, further comprising:

a range selector for selecting arbitrary sensors among the plurality of sensors of the photoelectric conversion unit,
wherein the first sensor is a sensor, among the arbitrary sensors selected by the range selector, in which the accumulation has been completed first.

7. A focus detection apparatus according to claim 1, wherein the focus detection unit detects a focal point by a phase difference method.

8. A focus detection apparatus according to claim 1, further comprising:
a range selector for selecting arbitrary sensors among the plurality of sensors of the photoelectric conversion unit,
conversion signal obtained by the second sensor, which is selected by the range selector and corrected by the correction unit among the photoelectric conversion signal obtained by the second sensor, and
wherein the focus detection unit performs the focus detection using the corrected photoelectric conversion signal and the photoelectric conversion signal of the first sensor, which is selected by the range selector.

9. An image pickup apparatus comprising:
an imaging optical system;
a photoelectric conversion unit of a charge accumulation type, including a plurality of sensors each having a plurality of image pixels, that receives light via the imaging optical system;
an accumulation controller for controlling charge accumulation of the photoelectric conversion unit;
an accumulation time measuring unit for measuring accumulation time from charge accumulation start to charge accumulation end of a first sensor among the plurality of sensors of the photoelectric conversion unit;
a correction unit for performing correction of a photoelectric conversion signal of a second sensor among the plurality of sensors of the photoelectric conversion unit; and
a focus detection unit for performing focus detection using the photoelectric conversion signal of the second sensor corrected by the correction unit, and a photoelectric conversion signal of the first sensor,
wherein:
the accumulation controller detects accumulation completion in the first sensor, and then causes the second sensor to terminate the charge accumulation; and
the correction unit performs the correction of the photoelectric conversion signal of the second sensor based on first accumulation time of the first sensor and second accumulation time of the second sensor.

10. A focus detection apparatus comprising:
a photoelectric conversion unit of a charge accumulation type, including a plurality of sensors each having a plurality of image pixels;
an accumulation controller for controlling charge accumulation of the photoelectric conversion unit;
an accumulation time measuring unit for measuring accumulation time from charge accumulation start to charge accumulation end of a first sensor among the plurality of sensors of the photoelectric conversion unit;
a correction unit for performing correction of a photoelectric conversion signal of the second sensor; and
a focus detection unit for performing focus detection by obtaining phase difference through correlation computing through connection of a photoelectric conversion signal of the first sensor and the photoelectric conversion signal of the second sensor corrected by the correction unit,
wherein:
the accumulation controller detects accumulation completion in the first sensor, and then causes the second sensor to terminate the charge accumulation; and
the correction unit performs the correction of the photoelectric conversion signal of the second sensor based on a ratio between first accumulation time of the first sensor and second accumulation time of the second sensor so as to provide continuity at a boundary of the first sensor and the second sensor between the photoelectric conversion signal obtained by the first sensor and the photoelectric conversion signal obtained by the second sensor upon connecting the photoelectric conversion signals of the first and second sensors.

11. A focus detection apparatus according to claim 10, wherein the correction unit performs the correction by multiplying a ratio between the first accumulation time and the second accumulation time by the photoelectric conversion signal of the second sensor.

12. A focus detection apparatus according to claim 10, wherein the first sensor is a sensor, among the plurality of sensors of the photoelectric conversion unit, in which the charge accumulation has been completed first.

13. A focus detection apparatus according to claim 10, wherein the second accumulation time is accumulation time of the second sensor for which the accumulation is caused to be terminated by the accumulation controller.

14. A focus detection apparatus according to claim 10, wherein the second accumulation time has a value obtained by adding a predetermined value to the first accumulation time.

15. A focus detection apparatus according to claim 10, further comprising:
a range selector for selecting arbitrary sensors among the plurality of sensors of the photoelectric conversion unit,
wherein the first sensor is a sensor, among the arbitrary sensors selected by the range selector, in which the accumulation has been completed first.

16. A focus detection apparatus according to claim 10, wherein the focus detection unit detects a focal point by a phase difference method.

17. A focus detection apparatus according to claim 10, further comprising:
a range selector for selecting arbitrary sensors among the plurality of sensors of the photoelectric conversion unit,
wherein the corrected photoelectric conversion signal includes the photoelectric conversion signal obtained by the second sensor, which is selected by the range selector and corrected by the correction unit among the photoelectric conversion signal obtained by the second sensor, and
wherein the focus detection unit performs the focus detection using the corrected photoelectric conversion signal and the photoelectric conversion signal of the first sensor, which is selected by the range selector.

18. An image pickup apparatus comprising:
an imaging optical system;
a photoelectric conversion unit of a charge accumulation type, including a plurality of sensors each having a plurality of image pixels;
an accumulation controller for controlling charge accumulation of the photoelectric conversion unit;
an accumulation time measuring unit for measuring accumulation time from charge accumulation start to charge accumulation end of a first sensor among the plurality of sensors of the photoelectric conversion unit;

a correction unit for performing correction of a photoelectric conversion signal of a second sensor among the plurality of sensors of the photoelectric conversion unit; and a focus detection unit for performing focus detection by obtaining phase difference through correlation computing through connection of a photoelectric conversion signal of the first sensor and the photo electric conversion signal of the second sensor corrected by the correction unit, wherein:

the accumulation controller detects accumulation completion in the first sensor, and then causes the second sensor to terminate the charge accumulation; and the correction unit performs the correction of the photoelectric conversion signal of the second sensor based on a ratio between first accumulation time of the first sensor and second accumulation time of the second sensor so as to provide continuity at a boundary of the first sensor and the second sensor between the photoelectric conversion signal obtained by the first sensor and the photoelectric conversion signal obtained by the second sensor upon connecting the photoelectric conversion signals of the first and second sensors.

* * * * *